United States Patent [19]

Howe et al.

[11] 4,092,137
[45] May 30, 1978

[54] GAS-ENTRAINED LIQUID SEPARATING MEANS WITH DUAL HOUSING

[75] Inventors: Frank D. Howe, Painted Post, N.Y.; Lee Max Hoppe, Davidson, N.C.

[73] Assignee: Ingersoll-Rand Company, Woodcliff Lake, N.J.

[21] Appl. No.: 835,158

[22] Filed: Sept. 21, 1977

[51] Int. Cl.² .......................................... B01D 45/16
[52] U.S. Cl. ..................................... 55/337; 55/184; 55/185; 55/458
[58] Field of Search ....................... 55/159, 183–188, 55/324, 337, 458, DIG. 17, DIG. 25

[56] References Cited

U.S. PATENT DOCUMENTS

| 3,046,717 | 3/1961 | Northrup et al. | 55/337 X |
|---|---|---|---|
| 3,071,915 | 1/1963 | Hardy | 55/337 X |
| 3,353,340 | 11/1967 | Carsey | 55/337 X |
| 3,822,532 | 7/1974 | Weisgerber | 55/337 X |
| 3,934,990 | 1/1976 | Ide | 55/337 X |

Primary Examiner—Frank A. Spear, Jr.
Assistant Examiner—Richard W. Burks
Attorney, Agent, or Firm—Bernard J. Murphy

[57] ABSTRACT

The invention comprises an L-shaped tank which, in combination, has both a vertical, liquid-reservoir housing and a horizontal, filter housing through which compressed gas, which has liquid entrained therein, is conducted. The gas is guided in centrifugal travel through the vertical housing, to separate out the liquid, and then it passes through a filter, fixed within the horizontal housing about an apertured outlet pipe, also to separate any remaining liquid from the compressed gas. A plurality of baffles require the product gas to follow a circuitous or tiered path through the vertical housing, and the apertured outlet pipe is offset from the center of the horizontal housing to insure that the being-filtered gas uniformly addresses the outlet pipe.

10 Claims, 5 Drawing Figures

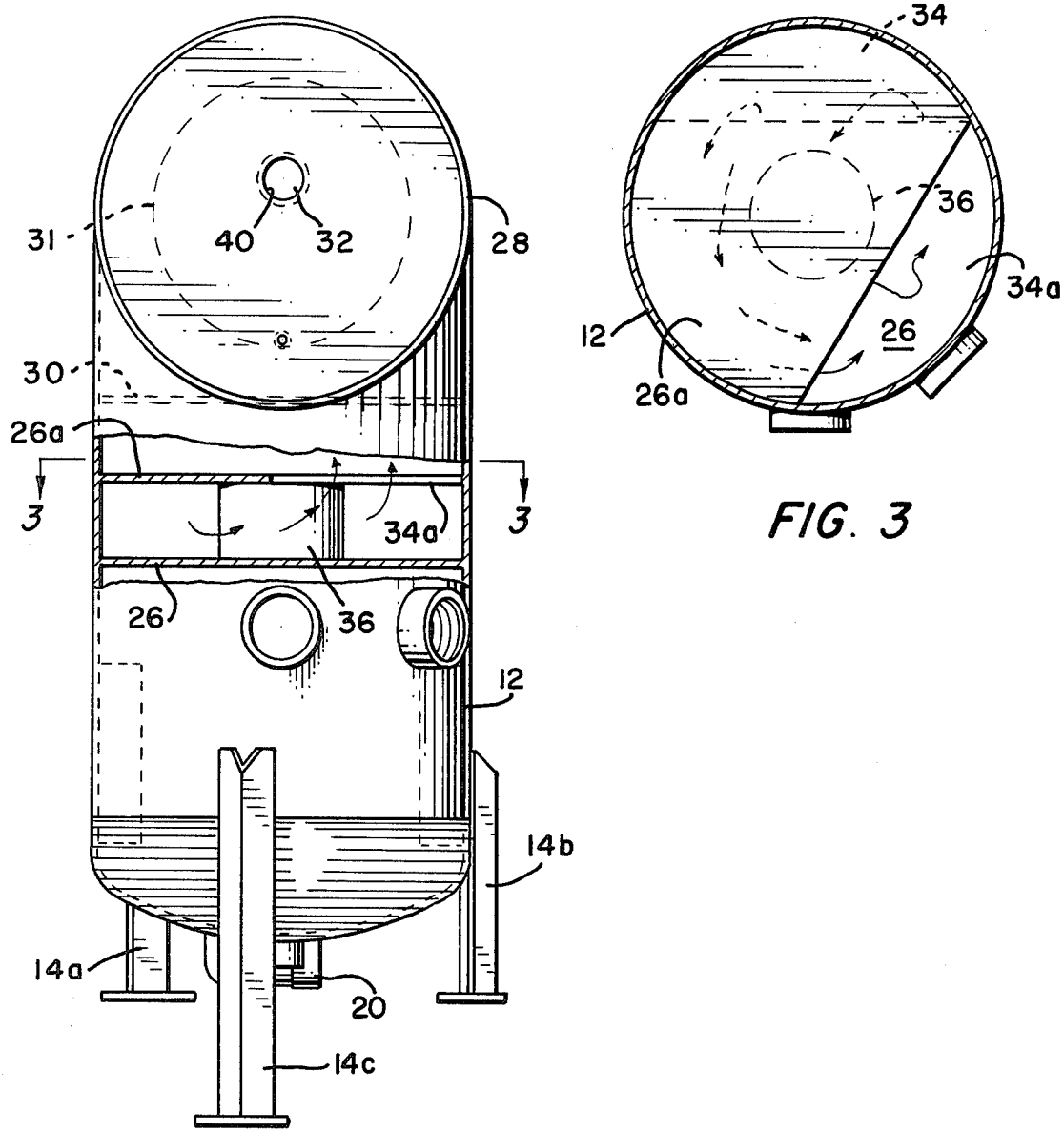
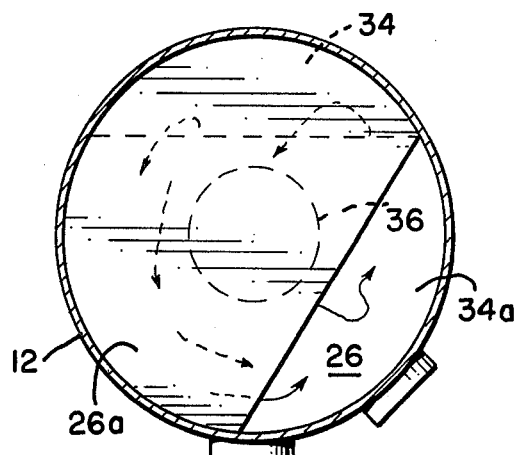
FIG. 3
FIG. 2

GAS-ENTRAINED LIQUID SEPARATING MEANS WITH DUAL HOUSING

This invention pertains to separating means and in particular to means for separating liquid from a gas which has such liquid entrained therein. Such apparatus is well known in the prior art, and has particular applications as concerns a compressed air product, which has oil entrained therein, the oil having been used for lubricating, cooling, and sealing the air compressor, but requiring removal from the product compressed air before the latter may be used in pneumatic equipment.

In the prior art, separating means as are well known typically involve a first unit which serves as an oil reservoir, a second unit which functions as a cyclonic separator, and finally a third outlet unit in which there is deployed a demister or filter through which the product air is conducted to remove any residual oil. These several structures ordinarily are arranged serially, either vertically or horizontally and, as a consequence, require complex and expensive inter-unit coupling and piping and occupy considerable, otherwise usable, space.

It is an object of this invention to set forth an improved separating means structure in which all the constituent elements thereof are combined in one unitized tank which occupies a very limited space.

Particularly it is an object of this invention to set forth means for separating liquid from a gas which has liquid entrained therein, comprising a tank; said tank having a vertical housing and a horizontal housing; said housings defining an interface by means of a wall common to both housings; first means for admitting gas into said vertical housing; second means within said vertical housing, and communicating with said first means, for conducting gas through said vertical housing for communication thereof with said horizontal housing; third means for discharging gas from said horizontal housing; means within said horizontal housing, and communicating with said second means, for conducting gas through said horizontal housing to said third means; wherein said second means comprise means for causing gas conducted through said vertical housing to move in circular paths, to cause entrained liquid to separate from therethrough-conducted gas; and said horizontal housing has means therewithin for separating entrained liquid from therethrough-conducted gas.

Further objects of this invention as well as the novel features thereof will become more apparent by reference to the following description taken in conjunction with the accompanying Figures in which:

FIG. 2 is a rear, elevational view of the embodiment of FIG. 1, an intermediate portion of the tank wall having been removed to expose the baffle structure;

FIG. 3 is a cross-sectional view taken along section 3—3 of FIG. 2;

Figure 1:
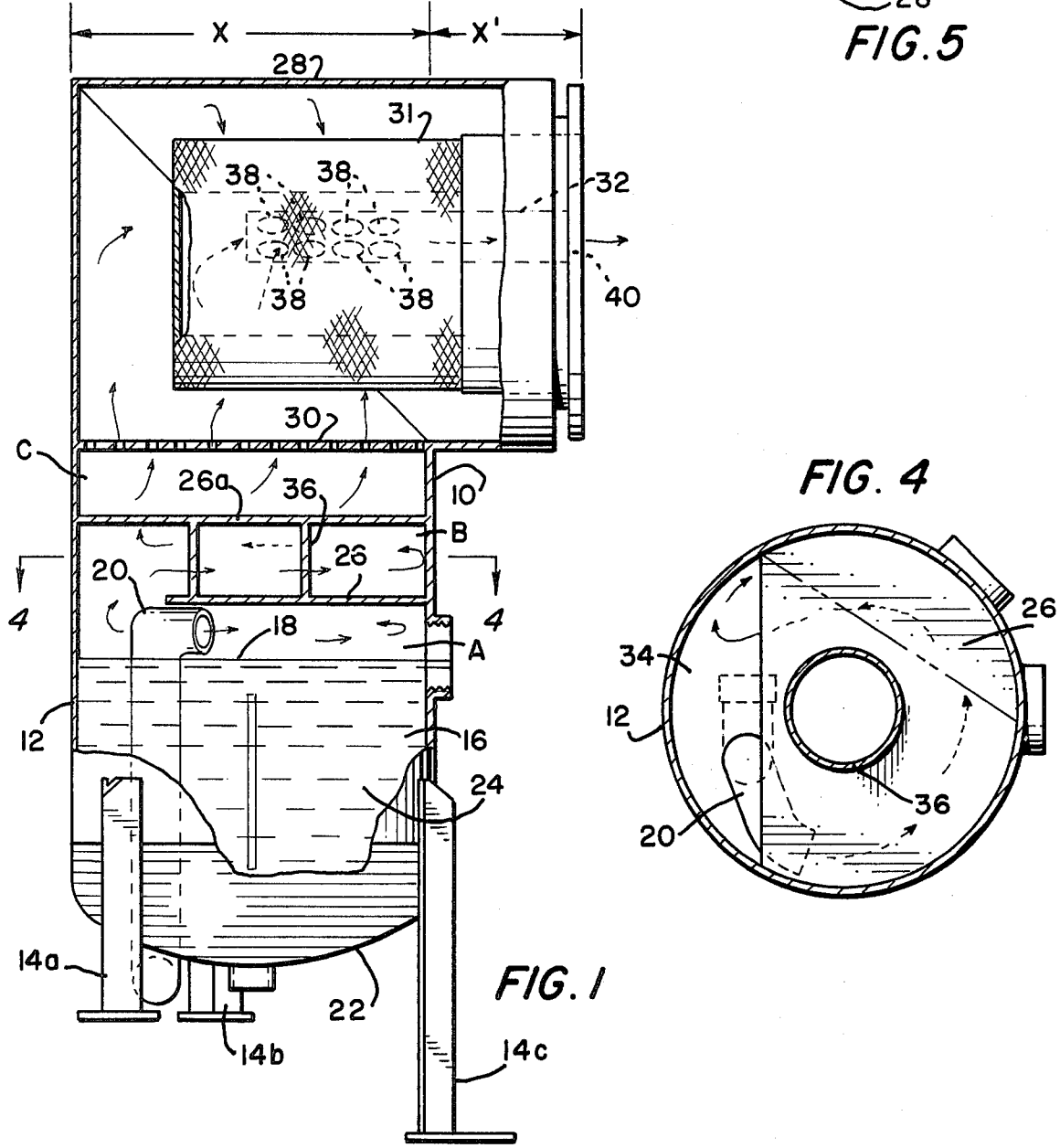
FIG. 1 is a side, elevational view of an embodiment of the invention, the same showing part of the wall of the tank broken away to show the inner gas-handling structure.
Figure 4:
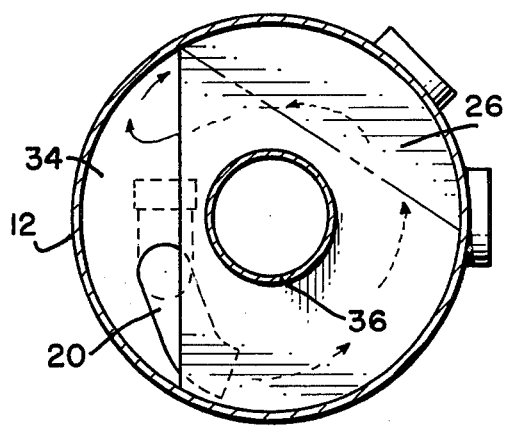
FIG. 4 is a cross-sectional view taken along section 4—4 of FIG. 1.
Figure 5:
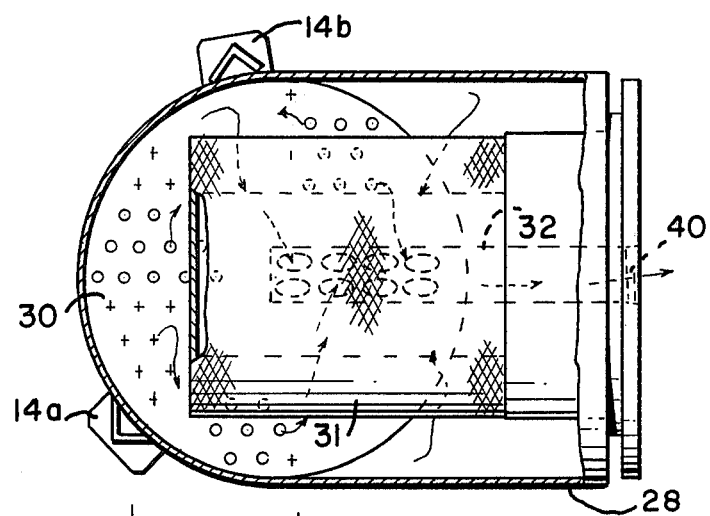
FIG. 5 is a plan or top view of the embodiment with part of the top wall of the tank having been removed to expose the filter element.

As shown in the Figures, a generally L-shaped tank 10 comprises a lowermost, vertical housing 12, supported on stanchions 14a, 14b and 14c, which confines therewithin an oil reservoir 16. The reservoir is maintained at an oil level 18, and an inlet pipe 20 conducts the gas product to be processed in through the bottom 22 of the vertical housing 12, and through the oil 24 being stored therein, to venting just above the oil level 18. Thereabove are a plurality of separating planes A, B and C divided by baffle plates 26 and 26a. Each baffle plate is open at only one side thereof and, as a consequence, the gas is caused to circle through planes A and B, and between the baffle plates 26 and 26a, for progress vertically toward an uppermost, horizontal housing 28. The lower, vertical and the upper, horizontal housings 12 and 28 share a common wall. The common wall comprises a multi-apertured plate 30 through the apertures of which the product gas passes in a uniform, vertically-directed dispersion, for address thereof to a filter element. The filter element 31 comprises an annular structure concentric with the horizontal housing 28, and envelops therewithin a spaced-apart, apertured outlet pipe 32. The product gas passes through the common wall/plate 30 and addresses the filter element 31 from all sides or radial directions. The gas passes through the filter element and then into the outlet pipe 32 as dry, oil-free gas.

It is to be noted that the inlet pipe 20, above the oil level 18, defines an arcuate bend. By this means, the admitted gas is caused to commence a circular track through plane A (below baffle plate 26). Hence, the heavier constituents of oil will impinge on the wall of the housing 12 and drain into the reservoir 16. A chordal section of plate 26 is omitted, defining thereat an opening 34 through which the gas is admitted to plane B. The gas in plane B is constrained to a same circular or cyclonic flow by the disposition of a central pipe 36 between baffle plates 26 and 26a. Hence, again the gas cycles through plane B, impinging oil onto the wall of the housing 12, until it comes upon another opening 34a; the latter, also, is defined by a chordal void or omission in plate 26a.

At this point in the gas handling, the circular or cyclonic conduct of the gas is interrupted; now the gas is constrained to describe a vertical flow, of uniform dispersion, through the apertures in the multi-apertured plate 30. Upon passing through plate 30, the gas rises into the horizontal housing 28 and, from all radial directions, addresses the filter element 31. The outlet pipe 32 too has a number of apertures 38 formed therein through which the filtered gas passes for travel through the pipe and discharge through the outlet 40 thereof. As FIGS. 1 and 2 show to better advantage, the outlet pipe 32 is offset relative to the center of filter 31. This is done to effect a more uniform throughput of gas; otherwise the lowermost portion of the filter 31 would reach saturation before the sides and uppermost portions thereof.

With reference to FIG. 1, it will be seen that the vertical housing 12 occupies a space defined by a diameter X and, with the horizontal housing 28 unitized therewith, and sharing a common wall/plate 30, the latter's overhang dimension X' is less than half the diameter X. Accordingly, more than half of the space required for horizontal housing 28 subsists within the spacial area necessary for the vertical housing, and a most compact, albeit efficient, separating means is defined thereby.

While we have described our invention in connection with a specific embodiment thereof, it is to be clearly understood that this is done only by way of example, and not as a limitation to the scope of our invention as set forth in the objects thereof and in the appended claims.

We claim:

1. Means for separating liquid from a gas which has liquid entrained therein, comprising:
    a tank;
    said tank having a vertical housing and a horizontal housing;
    said housings defining an interface by means of a wall common to both housings;
    first means for admitting gas into said vertical housing;
    second means within said vertical housing, and communicating with said first means, for conducting gas through said vertical housing for communication thereof with said horizontal housing;
    third means for discharging gas from said horizontal housing;
    means within said horizontal housing, and communicating with said second means, for conducting gas through said horizontal housing to said third means; wherein
    said second means comprise means for causing gas conducted through said vertical housing to move in circular paths, to cause entrained liquid to separate from therethrough-conducted gas; and
    said horizontal housing has means therewithin for separating entrained liquid from therethrough-conducted gas.

2. Separating means, according to claim 1, wherein:
    said wall has means for conducting gas therethrough in a plurality of vertically-oriented paths.

3. Separating means, according to claim 1, wherein:
    said wall has a plurality of perforations formed therein.

4. Separating means, according to claim 1, wherein:
    said second means further comprises means for conducting gas in a plurality of circular paths in a plurality of discrete planes, and means for conducting gas from each one of said planes to a plane adjacent thereto.

5. Separating means, according to claim 1, further including:
    reservoir means within said vertical housing for storing a supply of liquid; and wherein
    said first means comprises conduit means for admitting gas into said vertical housing in penetration of said reservoir means.

6. Separating means, according to claim 5, wherein:
    said reservoir means comprises means for storing liquid at a given supply level; and
    said conduit means comprises means for admitting gas into said vertical housing in a plane above and adjacent to said given level.

7. Separating means, according to claim 5, wherein:
    said conduit means comprises means for conducting gas therethrough in a first vertical path, in a second horizontal path, and in a third arcuate path.

8. Separating means, according to claim 1, wherein:
    said horizontal housing is cylindrical and has an axial center;
    said separating means within said horizontal housing comprises an annular filter concentric with said center; and
    said third means comprises an apertured pipe, enveloped by said filter, fixed parallel with said horizontal housing and filter, and offset from said center.

9. Separating means, according to claim 8, wherein:
    said horizontal housing has an arcuate side wall;
    said filter is spaced apart equidistant from said side wall and said common wall; and
    said pipe is fixed in closer proximity to said side wall than to said common wall.

10. Separating means, according to claim 1, wherein:
    said vertical housing occupies an area defined by a vertically-projected cylindrical space; and
    less than half of said horizontal housing projects beyond said space.

* * * * *

UNITED STATES PATENT AND TRADEMARK OFFICE
Certificate

Patent No. 4,092,137             Patented May 30, 1978

Frank D. Howe and Lee Max Hoppe

Application having been made by Frank D. Howe and Lee Max Hoppe, the inventors named in the patent above identified, and Ingersoll-Rand Company, Woodcliff Lake, New Jersey, a corp. of New Jersey, the assignee, for the issuance of a certificate under the provisions of Title 35, Section 256, of the United States Code, adding the name of Wilson A. Sherrill, II as a joint inventor, and a showing and proof of facts satisfying the requirements of the said section having been submitted, it is this 3rd day of June 1980, certified that the name of the said Wilson A. Sherrill, II is hereby added to the said patent as a joint inventor with the said Frank D. Howe and Lee Max Hoppe.

June 3

FRED W. SHERLING,
*Associate Solicitor.*